US009060193B2

(12) United States Patent
Whiteing

(10) Patent No.: US 9,060,193 B2
(45) Date of Patent: *Jun. 16, 2015

(54) SYSTEM AND METHOD FOR BROADCASTING VIDEO WITH A SECONDARY AUDIO SOURCE

(75) Inventor: Stephen Whiteing, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1123 days.

This patent is subject to a terminal disclaimer.

(21) Appl. No.: 12/632,164

(22) Filed: Dec. 7, 2009

(65) Prior Publication Data

US 2011/0138433 A1    Jun. 9, 2011

(51) Int. Cl.
| | |
|---|---|
| H04N 7/173 | (2011.01) |
| H04N 21/242 | (2011.01) |
| H04N 5/60 | (2006.01) |
| H04N 21/2368 | (2011.01) |
| H04N 21/2665 | (2011.01) |
| H04N 21/482 | (2011.01) |
| H04N 21/81 | (2011.01) |

(52) U.S. Cl.
CPC ............ *H04N 21/242* (2013.01); *H04N 5/602* (2013.01); *H04N 21/2368* (2013.01); *H04N 21/2665* (2013.01); *H04N 21/482* (2013.01); *H04N 21/8106* (2013.01)

(58) Field of Classification Search
CPC ............ H04N 21/218; H04N 21/8352; H04N 21/233; H04N 21/23418; H04N 21/2407; H04N 21/4394; H04N 21/2668; H04N 21/458
USPC ......... 725/9, 39, 41, 43, 106, 142, 32, 34, 35, 725/38, 107, 114, 135, 67, 134, 25, 64, 109, 725/31, 91, 47, 117
See application file for complete search history.

(56) References Cited

U.S. PATENT DOCUMENTS

| | | | |
|---|---|---|---|
| 5,440,351 | A | 8/1995 | Ichino |
| 8,369,680 | B2 | 2/2013 | Whiteing |
| 2002/0080163 | A1 | 6/2002 | Morey |
| 2003/0179317 | A1 | 9/2003 | Sigworth |
| 2003/0210887 | A1 | 11/2003 | Engle et al. |
| 2004/0128682 | A1* | 7/2004 | Liga et al. ...................... 725/35 |
| 2006/0248559 | A1* | 11/2006 | Michener et al. ............... 725/67 |
| 2006/0249559 | A1* | 11/2006 | Panthofer ..................... 228/101 |

(Continued)

OTHER PUBLICATIONS

U.S. Appl. No. 12/632,189; Final Rejection dated Mar. 2, 2012; 48 pages.

(Continued)

*Primary Examiner* — Nasser Goodarzi
*Assistant Examiner* — An Nguyen
(74) *Attorney, Agent, or Firm* — Swanson & Bratschun, L.L.C.

(57) ABSTRACT

Embodiments of the disclosed invention include an apparatus, method, and computer program product for providing a video source with a secondary audio source. For example, in one embodiment, a content provider receives a broadcast signal that includes a video component and an audio component from a content producer. The content provider receives a second audio component that provides audio corresponding to the video component of the broadcast signal. The second audio component is received from a second source, such as, but not limited to, a radio broadcast and/or an internet source. The content producer transmits the video component and the second audio component to a consumer device.

18 Claims, 10 Drawing Sheets

(56) References Cited

U.S. PATENT DOCUMENTS

| | | |
|---|---|---|
| 2007/0214488 A1* | 9/2007 | Nguyen et al. ............... 725/134 |
| 2008/0209482 A1 | 8/2008 | Meek et al. |
| 2008/0270344 A1 | 10/2008 | Yurick et al. |
| 2009/0245348 A1 | 10/2009 | Sugahara |
| 2009/0269037 A1 | 10/2009 | Mukaide et al. |
| 2009/0299748 A1 | 12/2009 | Basson et al. |
| 2010/0071014 A1 | 3/2010 | Brown et al. |
| 2011/0135282 A1 | 6/2011 | Whiteing |

OTHER PUBLICATIONS

U.S. Appl. No. 12/632,189; Issue Notification dated Jan. 16, 2013; 1 page.

U.S. Appl. No. 12/632,189; Non-Final Rejection dated Jan. 25, 2012; 42 pages.

U.S. Appl. No. 12/632,189; Non-Final Rejection dated Jul. 5, 2012; 44 pages.

U.S. Appl. No. 12/632,189; Notice of Allowance dated Oct. 1, 2012; 24 pages.

* cited by examiner

Electronic Programming Guide

Description of Program C
(Description of Available Audio)

Preview Window

| Channel | 7:00 | 7:30 |
|---------|------|------|
| 100 | Program A | Program B |
| 101 | Program C | Program C |
| 101A | Program C_SA1 | Program C_SA1 |
| 101B | Program C_SA2 | Program C_SA2 |
| 101C | Program C_SA3 | Program C_SA3 |
| 102 | Program D | Program D |

SYSTEM AND METHOD FOR BROADCASTING VIDEO WITH A SECONDARY AUDIO SOURCE

CROSS-REFERENCE TO RELATED APPLICATION

The present invention is related to the following patent application, entitled "System and Method for Synchronizing Broadcast Video with a Secondary Audio Source", Ser. No. 12/632,189; filed even date hereof, assigned to the same assignee, and incorporated herein in its entirety by reference.

BACKGROUND OF THE INVENTION

With today's technology, a consumer may receive video and/or audio content from a variety of sources. For example, the majority of homes receive nationally televised content from a cable and/or satellite service provider. In some circumstances, a consumer may desire to listen to a local broadcast of an event that it is being nationally televised. For example, a sports fan may desire to listen to a local radio broadcast of a sporting event while viewing the nationally televised broadcast of the sporting event. One option is to physically mute the nationally televised broadcast of the sporting event and turn on a radio to receive a local radio broadcast of the sporting event. However, this option is not desirable because the audio of the local radio broadcast and the video of the nationally televised event are generally not synchronized for one or more reasons. For example, a broadcaster may intentionally delay the video feed of a nationally televised broadcast for censoring purposes. In addition, this option would require the use of two separate devices. Accordingly, certain of the disclosed embodiments provide a system and method for broadcasting and synchronizing video with a secondary audio source that overcomes one or more of the above identified problems.

SUMMARY

Embodiments of the disclosed invention include a system, method, and computer program product for broadcasting and synchronizing video with a secondary audio source. For example, in one embodiment, a media server is disclosed that includes a set of input/output interfaces for receiving a broadcast signal from a first source and a second audio component from a second source. The broadcast signal includes a video component and a first audio component. The second audio component provides audio corresponding to the video component of the broadcast. In addition, the media server includes a processing unit that executes instructions to associate the video component with the second audio component. The media server uses the set of input/output interfaces for transmitting the video component and the second audio component to a consumer device.

BRIEF DESCRIPTION OF THE DRAWINGS

Illustrative embodiments of the present invention are described in detail below with reference to the attached figures, which are incorporated by reference herein and wherein:

FIG. 7 illustrates another embodiment of an electronic programming guide in accordance with certain embodiments of the invention;

DETAILED DESCRIPTION

The disclosed embodiments and advantages thereof are best understood by referring to FIGS. 1-10 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and not intended to assert or imply any limitation with regard to the environment, architecture, design, or process in which different embodiments may be implemented.

Figure 1:
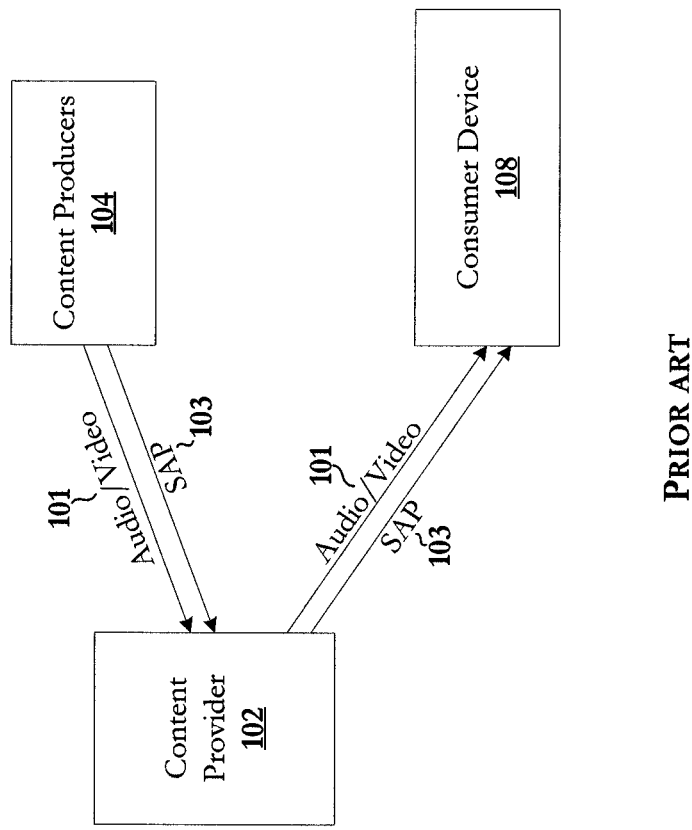
FIG. 1 illustrates a current method for providing secondary audio programming to a consumer device.

FIG. 1 illustrates a prior art method for providing secondary audio programming (SAP) to a consumer device 108. Currently, secondary audio programming is provided as an auxiliary audio channel for analog television. SAP is often used by a content producer 104, such as, the national broadcasting company (NBC), for providing an alternate language, most notably Spanish in the United States, for a broadcasted program. For instance, content producer 104 may generate alternate audio for a television program and transmit, to a content provider 102, the alternate audio on an auxiliary audio channel 103 associated with the primary audio and video channel 101 of the television program. Content provider 102 passes primary audio and video channel 101 and auxiliary audio channel 103 on to a plurality of consumers. Content provider 102 may be a cable, satellite, Internet Protocol Television (IPTV) provider, or a local television broadcasting station that provides television content to consumer devices, such as, consumer device 108. Consumer device 108 may be any type of device capable of receiving and decoding television signals, such as, but not limited to, an analog television, a digital television, a set-top box, a video recorder, a personal computer and/or a mobile device. For instance, the majority of televisions include a feature for switching the audio of a television program to the auxiliary audio channel for enabling secondary audio programming, if available for a given program.

However, the current method for providing secondary audio programming is limited/hampered by the fact that a content producer is responsible for generating the secondary audio programming. For instance, if a content producer chooses not to provide secondary audio programming for a particular show, a consumer has no other option available for receiving secondary audio programming with regard to the particular show. In addition, with the switch to all digital over the air broadcasting in the United States and other countries, some content providers, such as, but not limited to, some local area broadcasters, do not have the necessary equipment to pass the secondary audio programming generated by a content producer to a consumer device. Therefore, even if a content producer generates secondary audio programming, some consumers may still not receive the secondary audio programming.

Additionally, secondary audio programming provided by a content producer is generally limited to a direct translation from one language to a second language. Thus, a consumer that seeks secondary audio programming in a third language is generally left with no recourse. Further, current methods for providing secondary audio programming does not enable a consumer to receive alternative audio associated with a broadcast program, such as, but not limited to, a local radio broadcast associated with a nationally televised sporting event. Accordingly, certain of disclosed embodiments seek to provide a method, apparatus, and computer program product for overcoming one or more of the above identified problems associated with the prior art.

Figure 2:
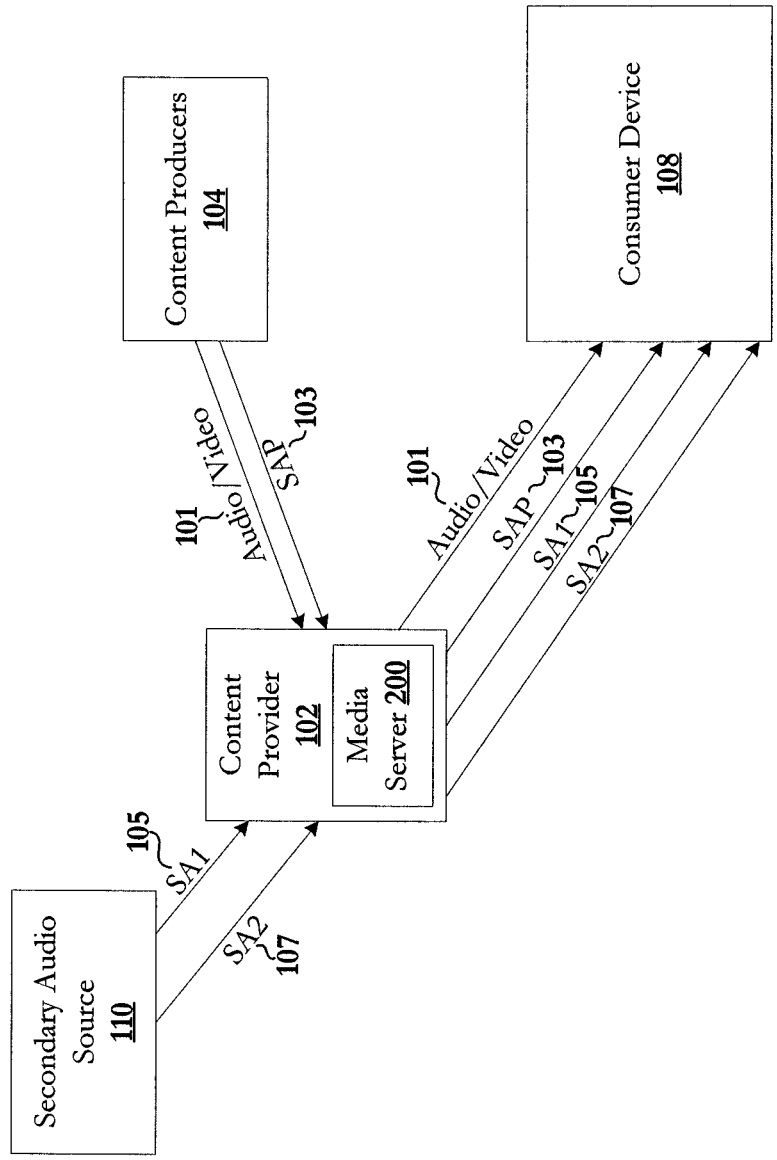
FIG. 2 illustrates an embodiment of a method for providing secondary audio programming to a consumer device in accordance with certain embodiments of the invention.

FIG. 2 illustrates an embodiment of a method for providing secondary audio programming to a consumer device in accordance with certain embodiments of the invention. In the depicted embodiment, content provider 102 receives audio and video channel 101 associated with a television program from content producer 104. In addition, in some embodiments, content provider 102 may also receive auxiliary audio channel 103 associated with the television program from content producer 104. In one embodiment, content provider 102, using a data processing system, such as, but not limited to, a media server 200, retrieves/receives alternative audio sources associated with the television program from sources other than content producer 104. For instance, in one embodiment, media server 200 retrieves secondary audio component 105 and secondary audio component 107 from a secondary audio source 110. Secondary audio source 110 may be, but is not limited to, a remote database containing alternative audio for video programs, one or more Internet website services that provide alternative audio sources, and/or one or more radio broadcasting services including, but not limited to, XM satellite radio. Secondary audio component 105 and secondary audio component 107 contain audio corresponding to the television program transmitted on primary audio and video channel 101. For example, secondary audio component 105 and secondary audio component 107 may contain audio in different languages corresponding to the television program transmitted on primary audio and video channel 101, such as, Chinese and Italian. In other embodiments, secondary audio component 105 and/or secondary audio component 107 may contain audio from different broadcasters, e.g., secondary audio component 105 may contain a sports broadcast from a local broadcast station associated with a particular sports team. For instance, in one embodiment, media server 200 may retrieve audio component 105 from LSUsports.net for enabling a consumer to listen to the local LSU broadcast of a sporting event. As will be further described, in some embodiments, media server 200 may be configured to automatically search for alternative audio sources corresponding to a particular program and/or may be manually configured to search prespecified sources for any alternative audio corresponding to a particular program. In one embodiment, content provider 102 passes primary audio and video channel 101, auxiliary audio channel 103 (if available), and any alternative audio, such as, but not limited to, secondary audio component 105 and secondary audio component 107, to consumer device 108. Alternatively, in other embodiments, content provider 102 may pass only a desired/requested alternative audio component to consumer device 108.

Figure 3:
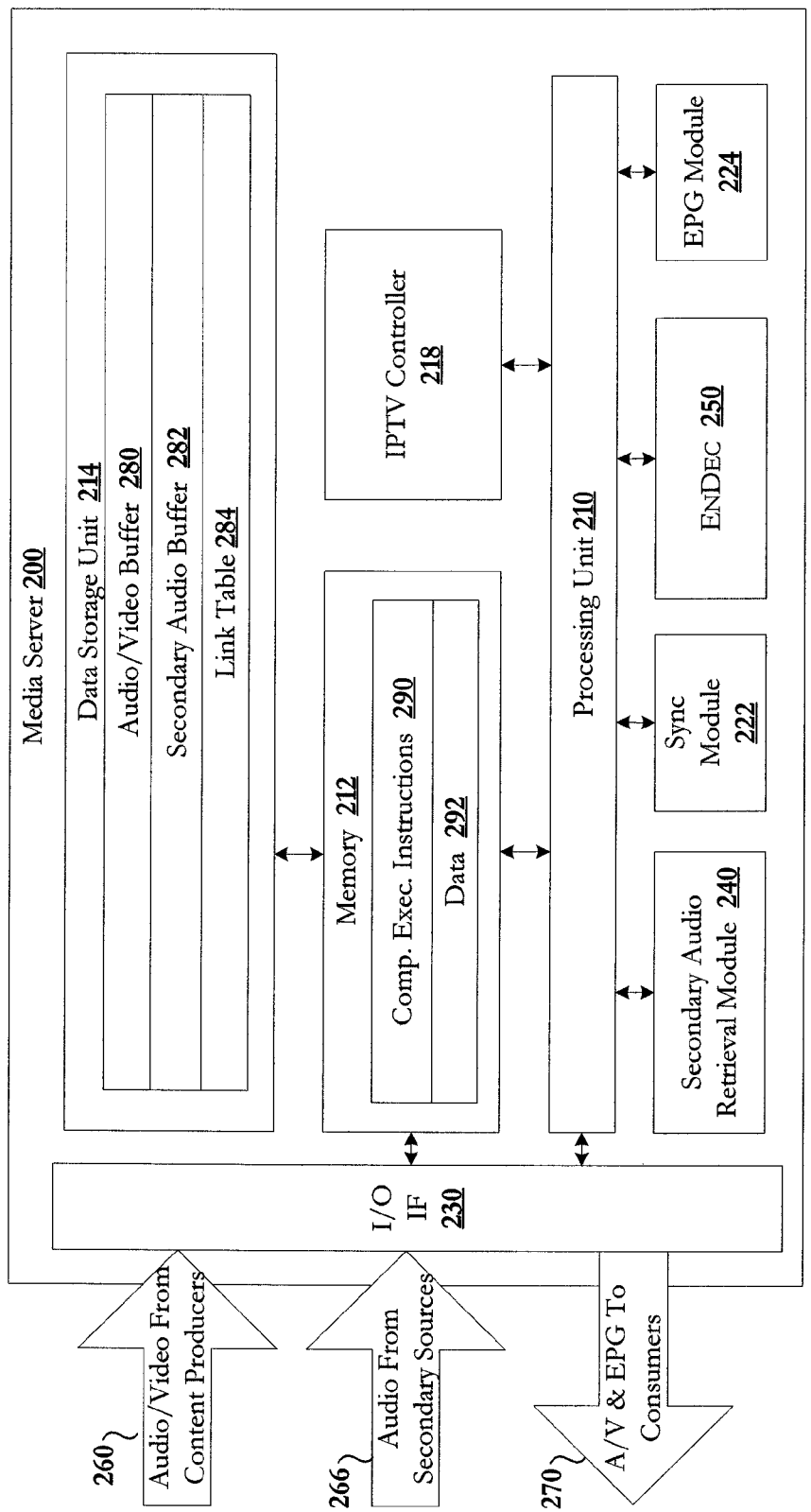
FIG. 3 illustrates an embodiment of a media server in accordance with certain embodiments of the invention.
Figure 4:
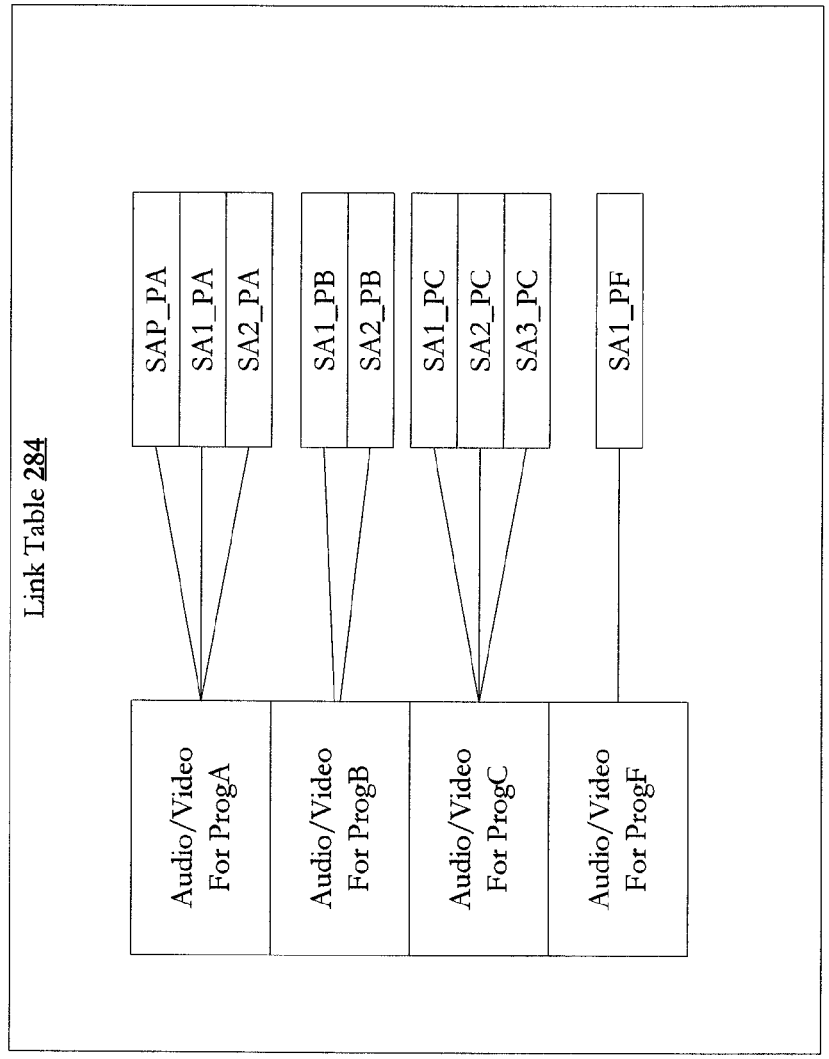
FIG. 4 illustrates an embodiment of a link table in accordance with certain embodiments of the invention.

FIG. 3 illustrates an embodiment of media server 200 in accordance with certain embodiments of the invention. In the depicted embodiment, media server 200 includes a set of input/output (I/O) interfaces 230 for receiving audio and video content 260 from content producer 104, secondary audio 266 from secondary audio source 110, and for transmitting audio, video, and other data content 270, such as, but not limited to, television programming content and an electronic programming guide (EPG) to consumer device 108. In one embodiment, the set of input/output interfaces 230 may include communication interfaces, such as, but not limited to, a coaxial cable connector and/or a fiber optic connection, for receiving signals from content producer 104 and transmitting signals/data to consumer device 108. In addition, in some embodiments, the set of input/output interfaces 230 may also include an Ethernet connection for providing a wired network connection to an IP network, such as, but not limited to, the Internet. Alternatively, or in addition to, in some embodiments, the set of input/output interfaces 230 may include one or more wireless communication component for enabling wireless communications. Additionally, in certain embodiments, the set of input/output interfaces 230 may include an antenna interface for receiving over the air (OTA) and/or satellite signals, such as, but not limited to, radio and/or television signals.

Media server 200 includes a processing unit 210 for executing instructions to process data, such as, but not limited to, computer executable instructions 290 and data 292 stored in memory 212. In one embodiment, memory 212 is volatile memory that requires power to maintain stored information. For example, memory 212 may be random access memory (RAM). Random access memory stores currently executing instructions and/or other data utilized by an operating system, software application and/or other components of media server 200. For instance, as will be further described, in one embodiment, computer executable instructions 290 may include instructions for configuring media server 200 to synchronize a video component of a broadcast signal and an audio component from a secondary source. In other embodiments, media server 200 may be configured to simply transmit the original broadcast signal and all additional secondary audio to consumer device 108.

Processing unit 210 may comprise one or more single or multi-core processors including, but not limited to, a central processing unit (CPU), a microprocessor, a graphics processing unit (GPU), and/or a digital signal processor for executing computer instructions. In some embodiments, processing unit 210 may route the data to another component of set top box 200 for further processing and/or storage. For instance, processing unit 210 may route the data to a data storage unit 214 for later retrieval and/or processing.

Data storage unit 214 may include one or more data storage units such as, but not limited to, one or more hard disk drives. In some embodiments, data storage unit 214 may be one or more remote data storage units accessible by media server 200. In the depicted embodiment, data storage unit 214 includes an audio/video buffer 280, a secondary audio buffer 282, and a link table 284. In one embodiment, media server 200 may permanently store audio and video associated with programs in audio/video buffer 280 for later retrieval. For example, in some embodiments, media server 200 may retrieve the audio and video associated with a program in response to receiving a video on demand request or an IPTV request for the program from consumer device 108. In other embodiments, media server 200 may utilize audio/video buffer 280 as a memory buffer to temporarily store live audio and video data for enabling media server 200 to process and synchronize the live video data with secondary audio data stored in secondary audio buffer 282. For instance, in some embodiments, media server 200 may utilize data stored in link table 284 for associating secondary audio sources/data to a particular video data. For example, as visually illustrated in FIG. 4, link table 284 may store data that links/associates one or more secondary audio sources to a particular program. In certain embodiments, link table 284 may be implemented using a data table, an array, a link list, pointers, and/or any other means for associating a video program with a secondary audio source.

Figure 5:
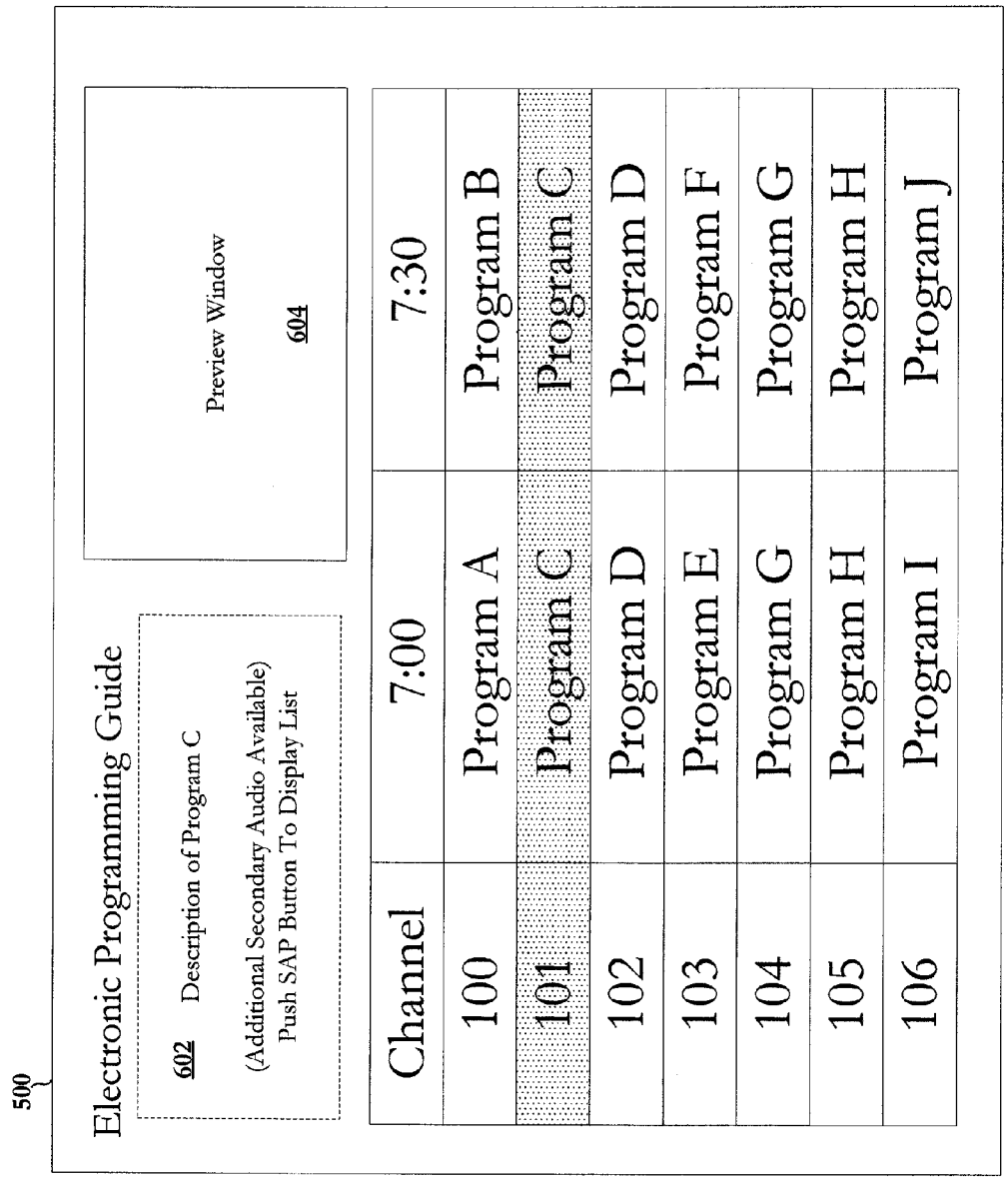
FIG. 5 illustrates an embodiment of an electronic programming guide in accordance with certain embodiments of the invention.
Figure 6:
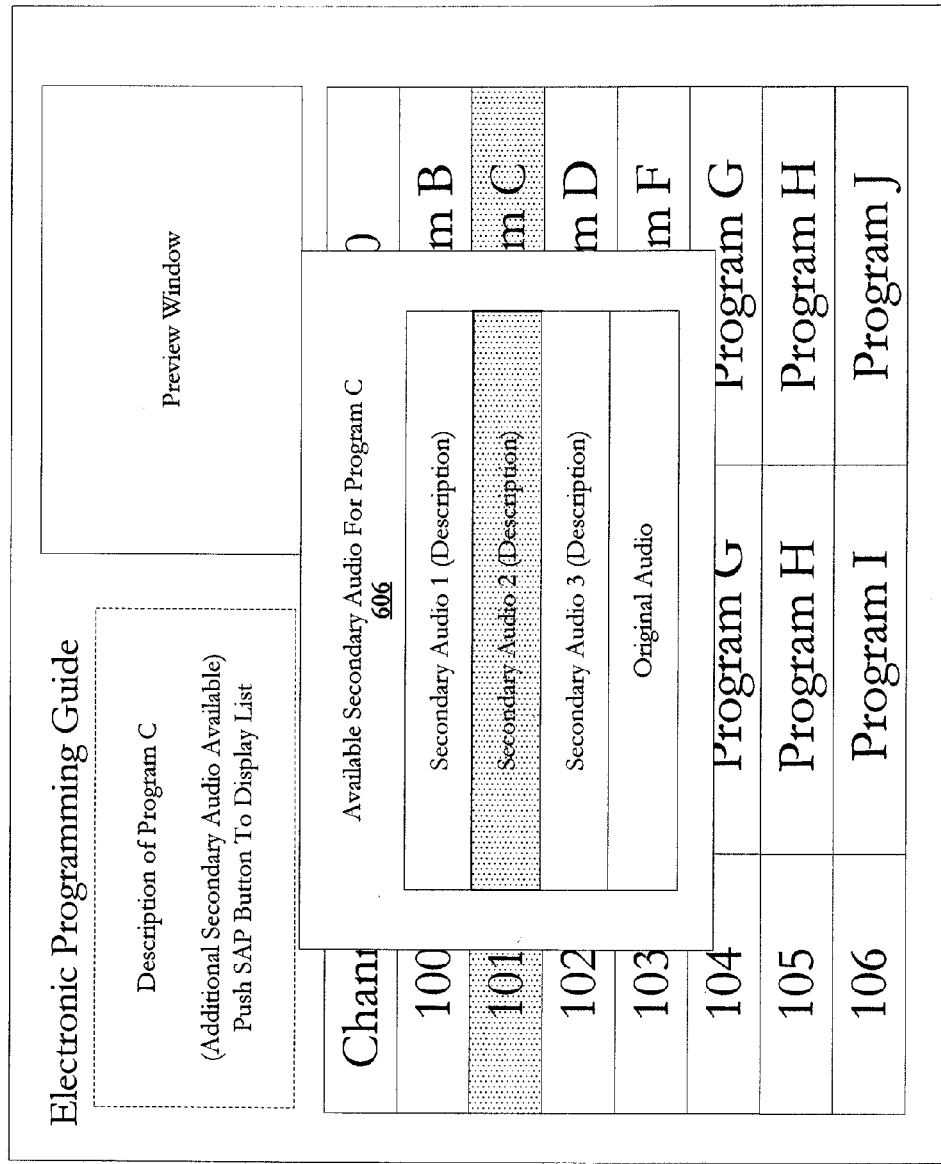
FIG. 6 illustrates an embodiment of an electronic programming guide with a secondary audio selection menu in accordance with certain embodiments of the invention.

In addition, in some embodiments, media server 200 may include an electronic program guide (EPG) module 224 for generating and updating an electronic program guide for enabling a viewer to select alternative secondary audio for a video program. In one embodiment, electronic program guide module 224 may utilize data stored in link table 284 for generating an electronic programming guide. As an example, FIG. 5 illustrates an electronic program guide 500 in accordance with one embodiment of the invention. Electronic program guide 500 may include a preview window 504 for enabling a user to view a highlighted channel/program. In addition, electronic program guide 500 may include a program description area 502 that provides information about a highlighted channel/program, e.g., channel 101/program C. In one embodiment, program description area 502 may also include information about the availability of any secondary audio associated with a highlight channel/program. For instance, in certain embodiments, a user may view a list 506, as illustrated in FIG. 6, of available secondary audio associated with a selected program by pressing an SAP button on a remote control device associated with consumer device 108. In some embodiments, list 506 may include a description of the available secondary audio such as the language, source, and/or other information. Alternatively, in some embodiments, electronic program guide module 224 may generate an electronic program guide 700 that sequentially lists the available secondary audio associated with a particular program as illustrated in FIG. 7. For instance, in the depicted embodiment, electronic program guide 700 lists the available secondary audio associated with program C in channel lineup 702. As an example, in the depicted embodiment, program C with its original audio content may be viewed on channel 101, program C with secondary audio 1 may be viewed on channel 101A, program C with secondary audio 2 may be viewed on channel 101B, and program C with secondary audio 3 may be viewed on channel 101C.

Additionally, in some embodiments, media server 200 may include an IPTV controller module 218 for handling IPTV requests from consumer device 108. As referenced herein, a module is defined as hardware, software, and/or a combination thereof. Software is defined as computer executable instructions including, but not limited to, object code, assembly code, and machine code. Hardware may include, but is not limited to, one or more processors/microprocessors, electrical circuitry, and logic gates. For instance, IPTV controller 218 may include dedicated hardware for transmitting video, audio, text, graphics, and other data to consumer device 108 over an IP computer network infrastructure instead of through traditional broadcast and cable formats. In a preferred embodiment, the IP computer network infrastructure is controlled by content provider 102 for ensuring quality of service. In other embodiments, media server 200 may utilize the Internet for transmitting video, audio, text, graphics, and other data to consumer device 108. In addition, IPTV controller 218 may control processing of live TV (multicasting) as well as stored video (Video on Demand VOD). For instance, in one embodiment, IPTV controller 218 may communicate with an encoder/decoder module 250 for compressing video, audio, text, graphics, and/or other data into a MPEG-2 or a MPEG-4 format. IPTV controller 218 may transmit the compressed data to consumer device 108 using an MPEG transport stream via IP Multicast for live TV or via IP Unicast for Video on Demand.

In addition, in certain embodiments, media server 200 may include a secondary audio retrieval module 240. In some embodiments, secondary audio retrieval module 240 may be utilized to automatically search for a secondary audio source using key words associated with a video broadcast program. For example, in one embodiment, secondary audio retrieval module 240 may query a search engine using a title associated with a video broadcast program for locating a corresponding audio broadcast. In another embodiment, secondary audio retrieval module 240 may be configured to retrieve a secondary audio source from a predetermined location. For example, in some embodiments, content provider 102 may have an agreement with a secondary audio source provider for providing audio in one or more languages. Additionally, in some embodiments, content provider 102 may have an agreement with a university to rebroadcast their local radio sports broadcasts. Alternatively, in other embodiments, secondary audio retrieval module 240 may be configured to enable manual searching for a secondary audio source. For instance, in some embodiments, secondary audio retrieval module 240 may include software, such as, but not limited to, a web browser or a search engine for enabling a user to search for related audio content associated with a particular broadcast. In other embodiments, secondary audio retrieval module 240 may include logic for enabling a user to provide secondary audio data to media server 200. For example, in some embodiments, one or more data processing systems may be communicatively coupled to media server 200 for providing secondary audio data to media server 200.

In some embodiments, media server 200 may include a synchronization module 222. In one embodiment, synchronization module 222 may be configured to simply output the video component of a television broadcast signal along with a secondary audio source while suppressing the output of the original audio component associated with the television broadcast signal. In other embodiments, synchronization module 222 may be configured to synchronize the video component of a television broadcast signal with a secondary audio source. For instance, in one embodiment, synchronization module 222 may include logic for dynamically synchronizing a video component of a television broadcast signal with a secondary audio source using data markers located in the video component and the secondary audio component. As referenced herein, a data marker is a signal, such as a pilot signal, and/or data stream that indicates a particular event and/or time reference associated with a broadcast program. A pilot signal is a signal, usually a single frequency, that is transmitted over a communications system for supervisory, control, equalization, continuity, synchronization, or reference purposes. For instance, in one embodiment, the television broadcast signal and the secondary audio source may include data markers for indicating a beginning of a program, a commercial break, and/or the end of a commercial break. In these embodiments, synchronization module 222 may dynamically synchronize the video component of a broadcast signal with a secondary audio source by aligning the data markers.

Additionally, in some embodiments, synchronization module 222 may be configured to switch between outputting the secondary audio source and outputting the original audio source associated with the broadcast signal. In one embodiment, synchronization module 222 may be configured to receive manual input from a user to switch between outputting the original audio source and outputting the secondary audio source. In other embodiments, synchronization module 222 may be configured to dynamically switch between outputting the original audio source and outputting the secondary audio source during commercial breaks. For instance, in some embodiments, a user may desire to listen to the commercials (e.g., Super Bowl commercials) using the original audio component of the broadcast signal. In some embodiments, content producer 104 may require content provider 102 configure synchronization module 222 to broadcast the original audio component during a commercial break to satisfy its advertisers.

Figure 8:
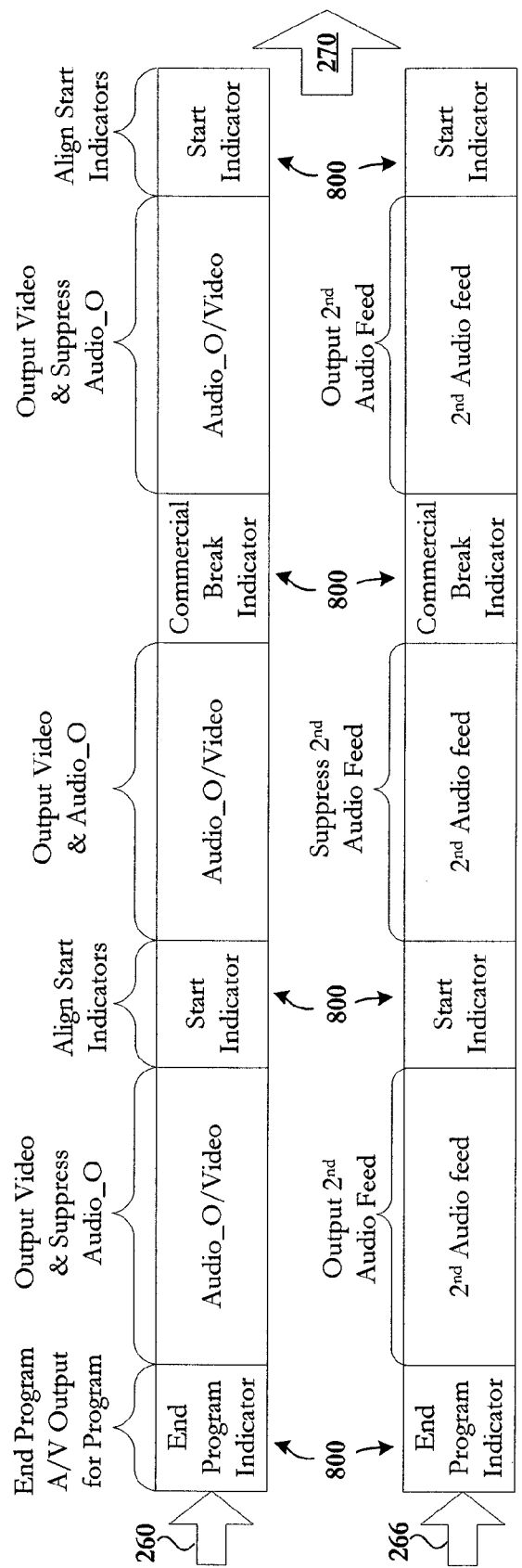
FIG. 8 illustrates an embodiment for synchronizing a video component a broadcast signal from a first source with a second audio component from a second source in accordance with certain embodiments of the invention.

As an example, FIG. 8 illustrates an embodiment for synchronizing a video component of a broadcast signal from a first source with a secondary audio component from a second source in accordance with certain embodiments of the invention. In the depicted embodiment, media server 200 receives audio and video content 260 from content producer 104 and secondary audio 266 from secondary audio source 110. In a preferred embodiment, audio and video content 260 and secondary audio 266 include data markers 800 respectively inserted by content producer 104 and by secondary audio source 110 to indicate to particular time references associated with a broadcast, such as, but not limited to, a beginning, end, and the occurrence of a break in programming. In other embodiments, media server 200 may include logic for filtering the data streams/signals to identify a particular event and/or other time references associated with the broadcast program for inserting the data markers.

In the depicted embodiment, media server 200 synchronizes the start of audio and video content 260 with the start secondary audio 266 by aligning their respective data markers that indicate the beginning of a broadcast. In one embodiment, media server 200 outputs to consumer device 108 the video component of audio and video content 260 with secondary audio 266 and suppresses the output of the audio component of audio and video content 260 during the broadcast of a particular show. In the depicted embodiment, in response to detecting a commercial break indicator, media server 200 suppresses the output of secondary audio 266 and outputs audio and video content 260 during the commercial break. In response to detecting a return from commercial break indicator, media server 200 suppresses output of the audio component of audio and video content 260 and outputs secondary audio 266. Media server 200 continues this process until an end of program indicator is detected.

Figure 9:
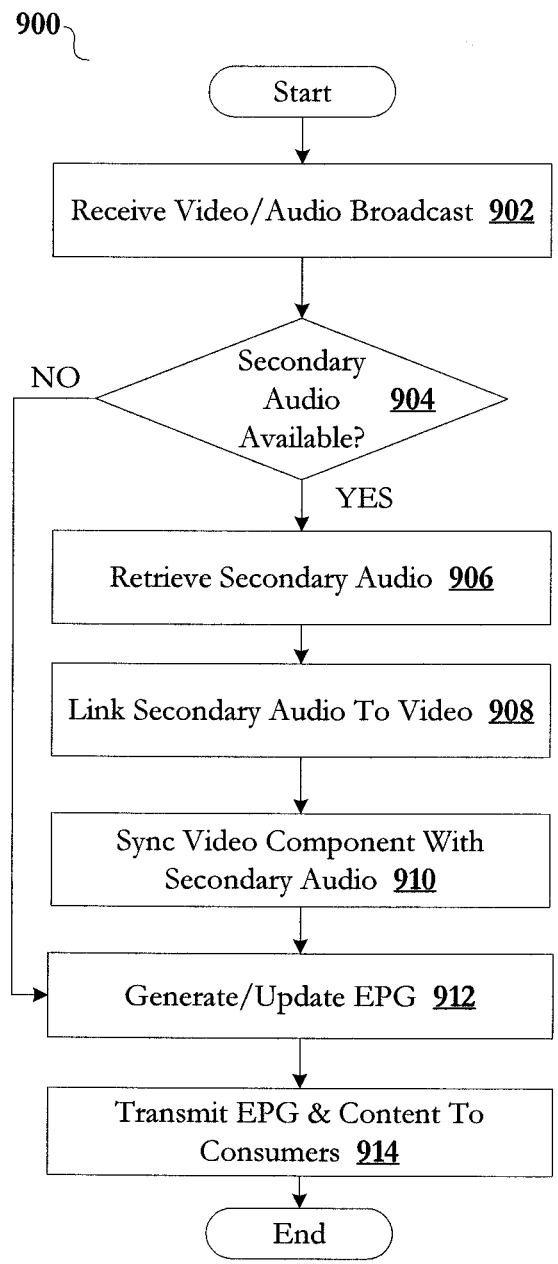
FIG. 9 illustrates an embodiment of a process for providing a video component with a secondary audio component in accordance with certain embodiments of the invention.

With reference now to FIG. 9, an embodiment of a process 900 for providing a video source with a secondary audio source is depicted in accordance with certain embodiments of the invention. Process 900 may be performed a data processing system such as, but not limited to, media server 200. In one embodiment, process 900 begins by receiving audio and video content from a content provider at step 902. At step 904, the process determines whether secondary audio corresponding to the video content is available from a secondary source. If the process determines that secondary audio corresponding to the video content is not available, the process skips to step 912. However, if the process determines that secondary audio corresponding to the video content is available, the process retrieves the available secondary audio content at step 906. In some embodiments, media server 200 retrieves the secondary audio content from secondary audio source 110. In other embodiments, secondary audio source 110 may automatically transmit secondary audio content to media server 200 when available. Alternatively, in some embodiments, media server 200 may retrieve the secondary audio content from a local and/or remote data storage unit, such as, but not limited to, data storage unit 214. At step 908, the process associates/links the retrieved secondary audio content to the audio and video content received from the content provider. In addition, in certain embodiments, the process, at step 910, synchronizes the secondary audio content to the audio and video content received from the content provider. In some embodiments, the process may generate and/or update an electronic program guide at step 912. In one embodiment, the process, at step 914, outputs the audio and video content received from the content provider, the secondary audio content, and the electronic program guide to consumer device 108, with process 900 terminating thereafter. In other embodiments, process 900, at step 914, may transmit only the electronic program guide to consumer device 108 and transmit the audio and video content and/or secondary audio to consumer device 108 only in response to receiving a request for the audio and video content and/or secondary audio content from consumer device 108, e.g., in the case of video on demand.

Figure 10:
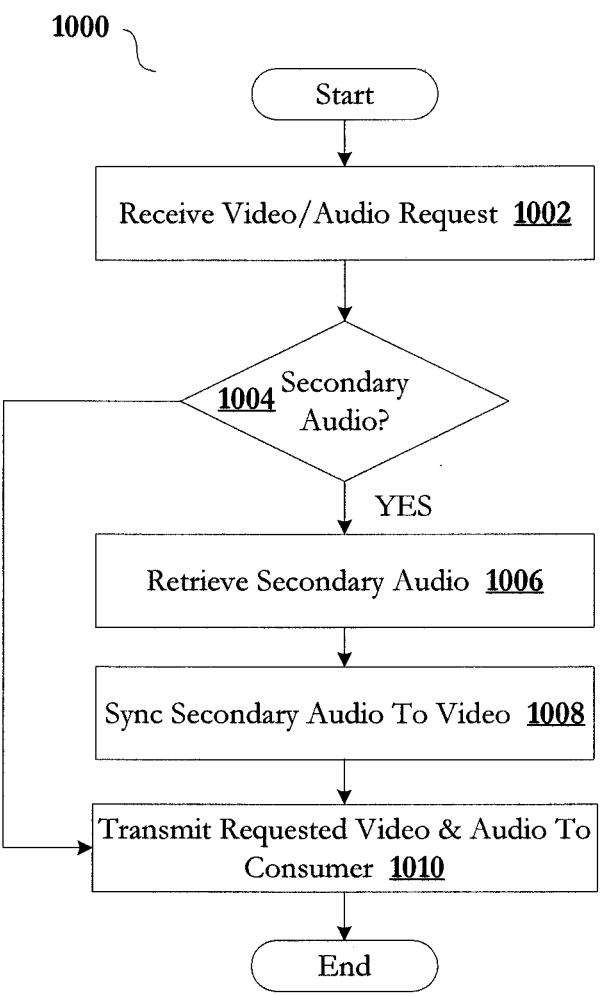
FIG. 10 illustrates another embodiment of a process for providing a video component with a secondary audio component in accordance with certain embodiments of the invention.

For instance, FIG. 10 illustrates an embodiment of a process 1000 for providing video content with a secondary audio source in response to media server 200 receiving, at step 1002, a request for audio and video content from a consumer device. In one embodiment, the request may be received from consumer device 108 in response to a user selecting a secondary audio choice from list 506 of available secondary audio associated with a selected program, as illustrated in FIG. 6. At step 1004, the process determines whether the request includes a request for secondary audio corresponding to the video content. In one embodiment, if the request does not include secondary audio content, the process transmits the requested video and audio content to consumer device 108 at step 1010, with process 1000 terminating thereafter. However, if the request does include secondary audio content, the process retrieves the requested secondary audio content at step 1006. In one embodiment, the process synchronizes the retrieved secondary audio content with the requested video content at step 1008. At step 1010, the process transmits the requested video and audio content to consumer device 108 with process 1000 terminating thereafter.

Accordingly, the above disclosure discloses several embodiments including a method, system, and computer program product for broadcasting secondary audio received from a second source and a video component received from a first source to a consumer device. The above disclosure describes certain embodiments of the claimed invention and is not intended to limit the scope of the claimed invention. In addition, the disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions, hardware components, and/or any combination thereof. In addition, the flowchart and block diagrams in the figures illustrate the architecture, functionality, and operation of possible implementations of systems, methods and computer program products according to various embodiments of the claimed invention. In this regard, each block in the flowchart or block diagrams may represent a module, segment, or portion of code, which may include one or more executable instructions for implementing the specified logical function(s). In some alternative implementations, the functions noted in the block may occur out of the order noted in the figures and/or may be omitted. In addition, two blocks shown in succession may, in fact, be executed substantially concurrently, or the blocks may sometimes be executed in the reverse order, depending upon the functionality involved.

Additionally, computer program instructions for executing the disclosed embodiments may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a data processing apparatus to cause a series of operational steps to be performed on the data processing system to produce a computer implemented process such that the instructions which execute on the data processing system provide processes for implementing the functions/acts specified in the flowchart and/or block diagram block or blocks.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The disclosed embodiments were chosen to explain the principles of the invention and the practical application, and to enable others of ordinary skill in the art to understand the invention for various embodiments with various modifications as are suited to the particular use contemplated.

I claim:

1. A computer implemented method for providing a video source with a secondary audio source, the method comprising:
   receiving, at a content provider, a broadcast signal from a first source, the broadcast signal includes a video component and an audio component;
   receiving, at the content provider, a second audio component from a second source, the second audio component providing audio corresponding to the video component of the broadcast signal;
   transmitting the video component from the first source and the second audio component from the second source to a consumer device;
   monitoring the video component for identifying a starting point of a commercial break;
   responsive to identifying the starting point of the commercial break, outputting the video component from the first source and the audio component from the first source while suppressing the output of the second audio component from the second source;
   monitoring the video component for identifying an end point of the commercial break; and
   responsive to identifying the end point of the commercial break; and
   outputting the video component from the first source and the second audio component from the second source while suppressing the output of the audio component from the first source.

2. The method of claim 1, further comprising:
   updating an electronic programming guide to include the second audio component as an audio option for the video component; and
   transmitting the electronic programming guide to the consumer device, wherein the electronic programming guide enables a user to initiate playing of the video component with the second audio component.

3. The method of claim 1, further comprising synchronizing the second audio component to the video component.

4. The method of claim 1, further comprising synchronizing the second audio component to the video component using data markers located in the video component and the second audio component.

5. The method of claim 1, further comprising receiving user input to synchronize the second audio component to the video component.

6. The method of claim 1, further comprising receiving the second audio component from a radio broadcast.

7. The method of claim 1, further comprising receiving the second audio component from an Internet source.

8. The method of claim 1, further comprising querying an Internet search engine for the second audio component using key words associated with a subject of the broadcast signal.

9. A media server comprising:
   a set of input/output interfaces for receiving a broadcast signal from a first source and a second audio component from a second source, the broadcast signal includes a video component and a first audio component, the second audio component providing audio corresponding to the video component of the broadcast signal;
   a processing unit that executes instructions to associate the video component with the second audio component; and
   the set of input/output interfaces transmits the video component from the first source and the second audio component from the second source to a consumer device; and
   wherein the processing unit further executes instructions to:
      monitor the video component for identifying a starting point of a commercial break;
      responsive to identifying the starting point of the commercial break, output the video component from the first source and the first audio component from the first source while suppressing the output of the second audio component from the second source;
      monitor the video component for identifying an end point of the commercial break; and
      responsive to identifying the end point of the commercial break; and
      output the video component from the first source and the second audio component from the second source while suppressing the output of the first audio component from the first source.

10. The media server of claim 9, further comprising a synchronization module for synchronizing the video component with the second audio component.

11. The media server of claim 9, further comprising a secondary audio retrieval module for retrieving the second audio component from the second source.

12. The media server of claim 9, further comprising an electronic program guide module for generating and updating an electronic program guide for enabling selection of the second audio component with the video component.

13. The media server of claim 9, further comprising a data storage unit for storing the second audio component and the video component.

14. A computer program product comprising a non-transitory computer usable medium having a computer readable program code embodied therein, said computer readable program code comprising instructions to:
  receive a broadcast signal from a first source, the broadcast signal includes a video component and a first audio component;
  receive a second audio component from a second source, the second audio component providing audio corresponding to the video component of the broadcast;
  transmit the video component from the first source and the second audio component from the second source to a consumer device;
  monitor the video component for identifying a starting point of a commercial break;
  responsive to identifying the starting point of the commercial break, output the video component from the first source and the first audio component from the first source while suppressing the output of the second audio component from the second source;
  monitor the video component for identifying an end point of the commercial break; and
  responsive to identifying the end point of the commercial break; and
  output the video component from the first source and the second audio component from the second source while suppressing the output of the first audio component from the first source.

15. The computer program product of claim 14, wherein the computer readable program code further comprises instructions to update an electronic programming guide to include the second audio component as an audio option for the video component.

16. The computer program product of claim 15, wherein the electronic programming guide includes information about the second audio component.

17. The computer program product of claim 14, wherein the computer readable program code further comprises instructions to synchronize the second audio component to the video component.

18. The computer program product of claim 14, wherein the computer readable program code further comprises instructions to search for the second source providing the second audio component.

* * * * *